L. Miller.
Harvester Rake.
No 51071 — Patented Nov. 21, 1865.
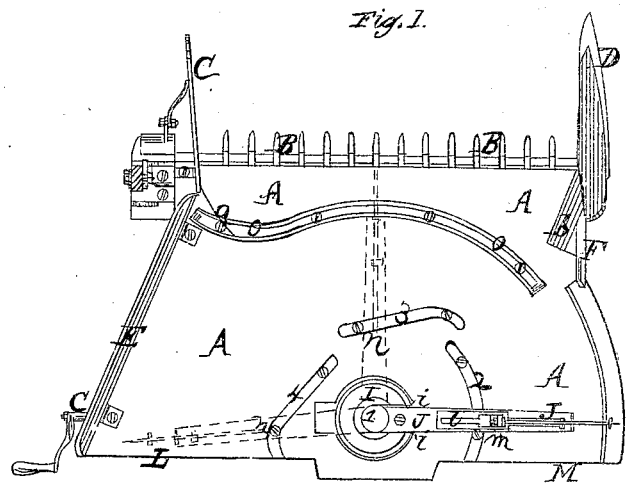
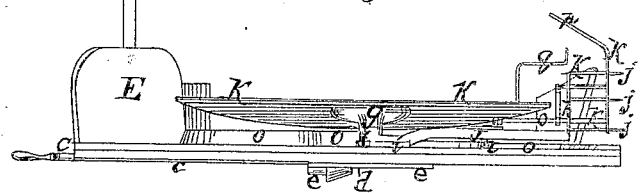
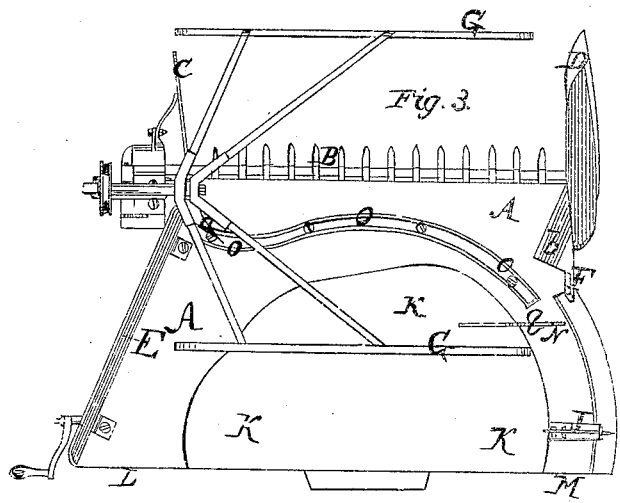
Witnesses: Lewis Miller

UNITED STATES PATENT OFFICE.

LEWIS MILLER, OF AKRON, OHIO.

IMPROVEMENT IN RAKE ATTACHMENTS TO HARVESTERS.

Specification forming part of Letters Patent No. 51,071, dated November 21, 1865.

*To all whom it may concern:*

Be it known that I, LEWIS MILLER, of Akron, in the county of Summit and State of Ohio, have invented certain new and useful Improvements in Raking Attachments for Harvesting-Machines; and I do hereby declare the following to be a full, clear, and exact description of the same, reference being had to the accompanying drawings, making a part of this specification, in which—

Figure 1 represents a top plan of so much of the platform and cutting apparatus of a harvesting-machine as will illustrate my invention, the table on which the grain falls being omitted in this figure to show the working of the rake underneath it. Fig. 2 represents a rear elevation of the platform, grain-table, rake, and other portions of the apparatus. Fig. 3 represents a top plan with the grain-table in place, and which conceals the raking mechanism that is underneath it.

Similar letters of reference, where they occur in the separate figures, denote like parts of the machine in all the drawings.

My invention relates, first, to a clearer for removing the grain from the rake at the delivery-point, and said clearer being operated by guides or switches on the platform; and it further consists in combining a clearer with a rake, so that the former may aid the rake in carrying around the grain, and then push it from the rake at the proper point of delivery; and it further consists in the combination of a bent arm or tang on the clearer with a bent arm or tang on the grain-table, the two operating to catch, hold, take, and carry the grain that may fall toward or in the open space through which the rake passes to do its work and carry it within the influence of the rake; and it further consists in the arrangement of a stationary post, over which the gear-wheel that operates the rake is placed so as to turn around it, and on top of which the elevated grain-table is placed and remains stationary, and which furnishes a support for the turning-rake through a shoe cast or wrought on the gear-wheel.

To enable others skilled in the art to make and use my invention, I will proceed to describe the same with reference to the drawings.

A represents a platform of any well-known construction; B, a cutting apparatus at the front thereof; C, the inside, and D the outside, dividers; and E the inside, and F the outside, guiding boards or fences extending rearward from the dividers, respectively.

G is a reel arranged on a post, H, both of which may be adjustable.

*a* and *b* are short wings or shields attached to the inside and outside dividers, respectively, to direct the grain within the reach of the rake.

A shaft, *c*, is placed under the rear portion of the platform A, which may be driven from the main driving power or gear in any of the well-known ways. On this shaft *c*, at about the middle rear portion of the platform, there is a bevel-pinion, *d*, Fig. 2, which gears with and turns a bevel-wheel, I, Fig. 1, to which the rake-arm J is affixed, and by which the rake receives its sweeping motion.

A shield-plate, *e*, underneath the platform entirely protects the pinion *d* and gear I, so that no straws or grass can wind in them, and on this shield-plate there is fixed a vertical stud, 1, over which the hub *f* of the wheel I is placed, said stud forming the support or journal on which said wheel I turns.

Upon the top of the stud 1 is set, by means of a suitable metallic socket or other support, *g*, the grain-table K, upon which the heads of the severed grain rests and are supported, and underneath which the rake-arm J turns. By the use of this permanent stud 1, I attain two desirable objects, first, a support for the gear I, around which it may turn; and, secondly, a support for the grain-table K, upon which it may be held without turning, while there is a free and unincumbered space underneath it for the rake-arm to sweep around in. A shaft turning with the wheel I would not answer as a support for the table, as the latter would then turn with the shaft. Any other support than one passing up through the center of the wheel would prevent the turning of the rake-arm.

There is a shoe, *i*, cast or wrought on the top of the wheel I, in which the rake-arm J is fixed, so that it may turn with said wheel, and on the outer end of the rake-arm there is a vertical post, *h*, with horizontal arms *j* projecting from it, which act, in conjunction with the sliding clearer k, to take, carry around, and deliver the grain, as follows: There is a slot, l, in the rake-arm, in which a stud, m, can work, the lower end of said stud having a friction-roll, n, upon it, which runs against or in contact with the switches 2 3 4, as shown by red dotted lines in Fig. 1, to move the clearer out and in upon the arms j, first to expose said arms and allow them to take the grain, and then at the delivery-point L to push the gavel from the points or rake and allow it to fall upon the ground; and though I speak of the point L as the "delivery-point," the rake may work in the other direction, so as to deliver at M, if so preferred. The roll n runs outside of the switch 2, inside of the switch 3, and outside of the switch 4, and thus gets the proper motion to work the clearer, which is connected to said roll by the rod o through a slide and the stud m before mentioned. If the delivery is to be at M, then these switches should be transposed.

On the clearer k there is an arm, p, curved and inclined toward the center of motion of the rake, and upon the grain-table A there is another curved arm, q, projecting over the open space N, through which the rake passes to commence clearing the grain-table. The arm p passes over the top of the arm q. Thus the two arms conjointly catch, hold, and then carry forward any straws that may have fallen in that direction, though the shield b will prevent to a very great extent any grain from falling in that open space or direction and clogging the rake.

L, as above mentioned, is the delivery-point; but it may be at M by reversing the action of the rake.

There is a ledge, O, slightly raised above the platform A, and it is designed for holding up the butts of the straws, while the heads lie upon the table K, and thus an unobstructed space is left, through which the rake-arm may pass underneath the grain, while the rake will, with certainty, take the grain and carry it around and deliver it, as above stated.

The table K, as seen in Fig. 3, inclines from its rear toward its front, so that its front edge shall be but little if any higher than the ledge O. This is to prevent the grain from passing in under the table and clogging the rake and its clearer. So, too, to prevent the grain pushing through the rake itself, the clearer k may be covered with canvas or any other light material.

Having thus fully described my invention, what I claim is—

1. A clearer for pushing the grain from the rake when said clearer is operated from guides or switches placed on the platform, substantially as described.

2. The combination of a rake and clearer when so operating as that the latter is made to aid the former in carrying the grain around to the point of delivery and then pushing it off from the rake, substantially as described.

3. The combined action of the movable bent arm on the clearer or rake and the stationary bent arm on the grain-table, the two operating to prevent the grain from falling into the open space through which the rake moves, substantially in the manner herein described.

4. The use of the stationary stud i as a permanent support for the wheel that carries the rake to move around and as a stationary support for the grain-table, and to make an unobstructed space for the rake-arm to sweep or turn in, substantially as described.

L. MILLER.

Witnesses:
A. B. STOUGHTON,
EDM. F. BROWN.